United States Patent
Bonds

(10) Patent No.: US 9,365,098 B2
(45) Date of Patent: Jun. 14, 2016

(54) CORE METAL INSERT WITH MECHANICAL STRENGTHENING AND METHOD OF MAKING SAME

(71) Applicant: Scovil Hanna Corporation, Cleveland, OH (US)

(72) Inventor: Roy L. Bonds, Valley City, OH (US)

(73) Assignee: SCOVIL HANNA CORPORATION, Cleveland, OH (US)

( * ) Notice: Subject to any disclaimer, the term of this patent is extended or adjusted under 35 U.S.C. 154(b) by 384 days.

(21) Appl. No.: 14/134,693

(22) Filed: Dec. 19, 2013

(65) Prior Publication Data

US 2014/0193657 A1    Jul. 10, 2014

Related U.S. Application Data

(60) Provisional application No. 61/749,468, filed on Jan. 7, 2013.

(51) Int. Cl.
*B60J 10/00* (2006.01)
(52) U.S. Cl.
CPC ...... *B60J 10/0011* (2013.01); *Y10T 428/12215* (2015.01)

(58) Field of Classification Search
None
See application file for complete search history.

(56) References Cited

U.S. PATENT DOCUMENTS

| | | |
|---|---|---|
| 5,783,312 A | 7/1998 | Laughman et al. |
| 5,871,682 A | 2/1999 | Kii et al. |
| 6,079,160 A | 6/2000 | Bonds |
| 6,889,985 B2 | 5/2005 | Bonds |
| 7,604,766 B2 | 10/2009 | Bonds |
| 8,205,390 B2 | 6/2012 | Ogilvie |

*Primary Examiner* — Adam Krupicka
(74) *Attorney, Agent, or Firm* — Pearne & Gordon LLP

(57) ABSTRACT

An elongate core metal insert for reinforcing a resilient weatherseal includes a main body portion extending along a longitudinal axis, opposed first and second edges, and opposed first and second face surfaces extending between the first and second edges. A plurality of flutes are formed into the first and second face surfaces of the core metal insert in an undulating pattern, and extend between the first and second edges such the core metal insert is corrugated. The corrugation of the core metal insert separates the first and second face surfaces by a distance greater than the original thickness of the core metal insert. A method of providing such a core metal insert also is provided.

14 Claims, 10 Drawing Sheets

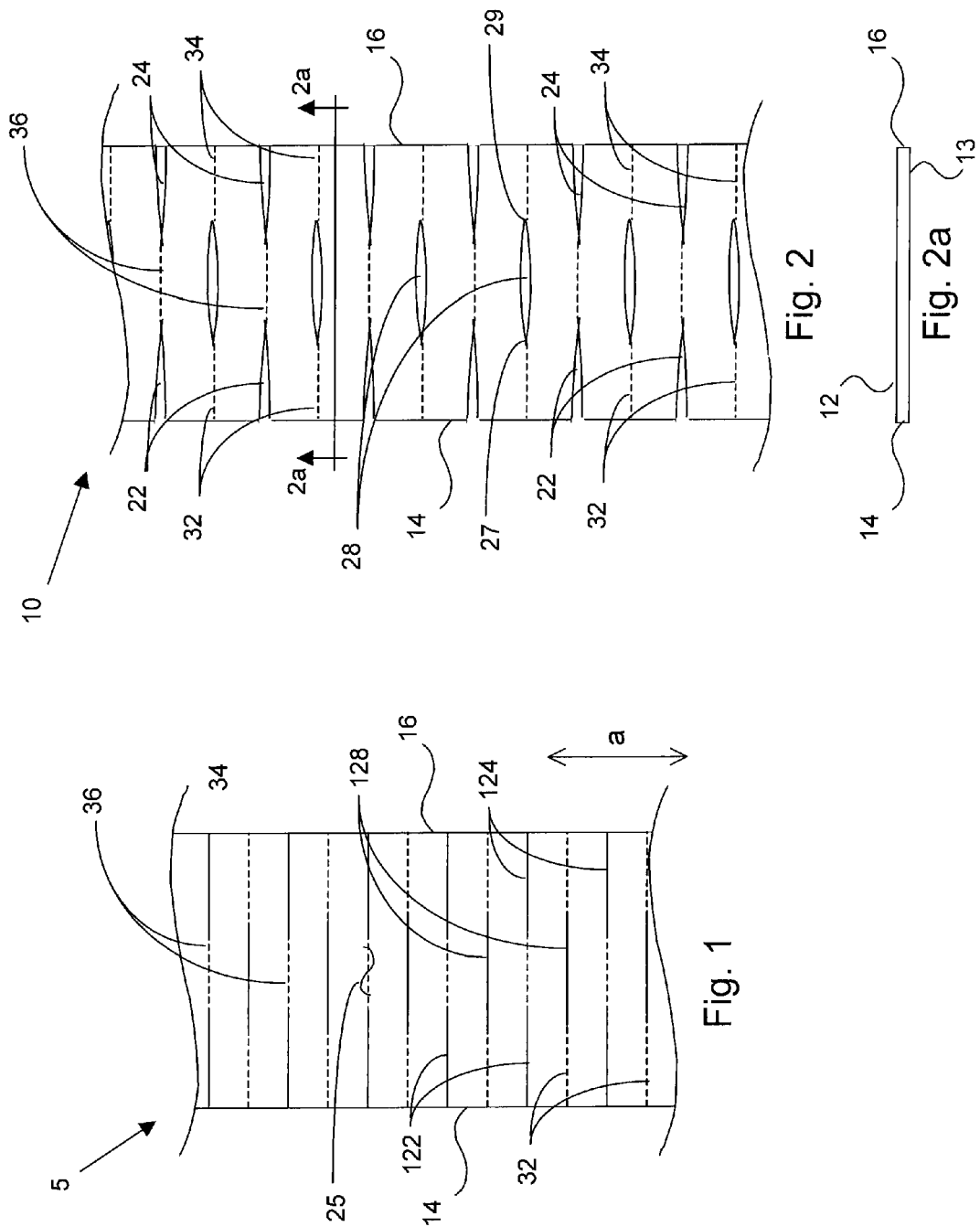

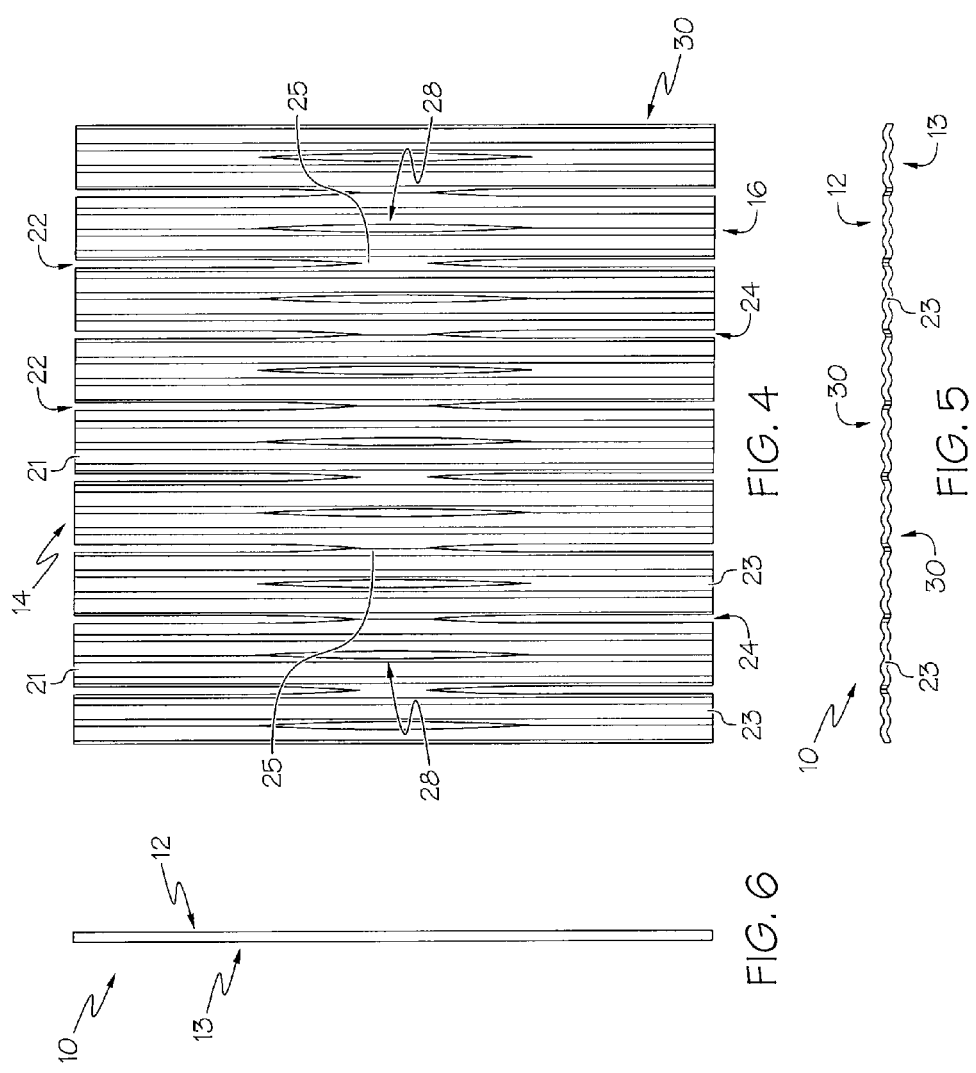

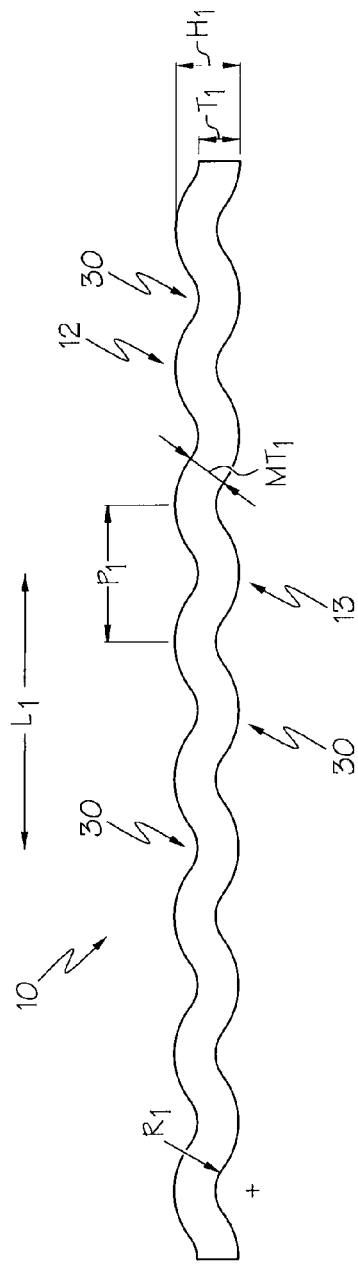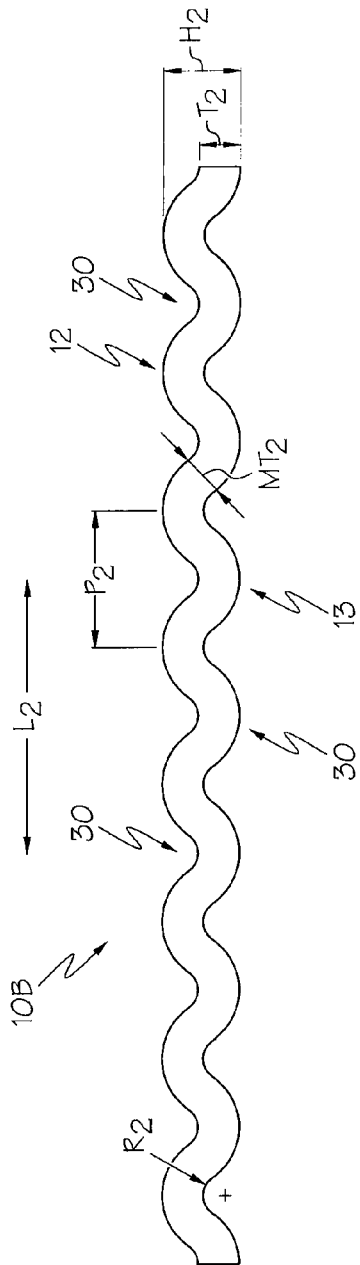

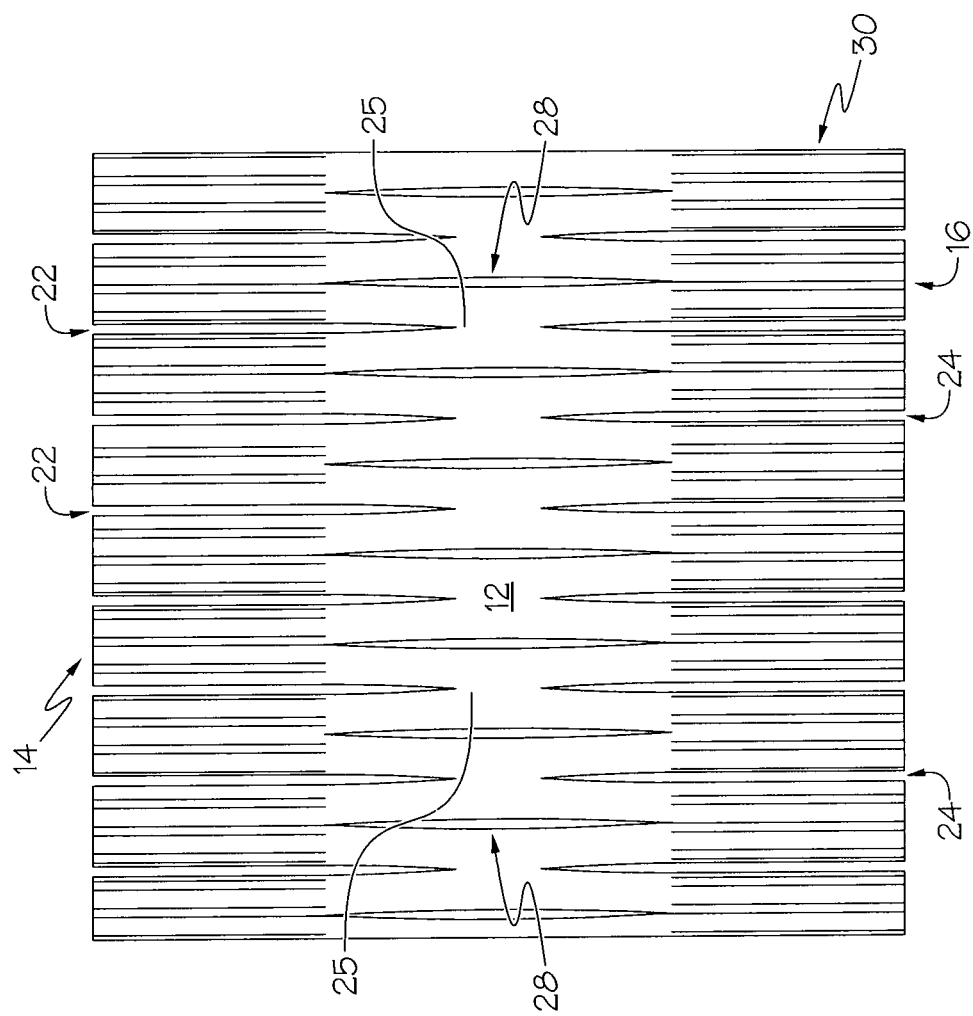

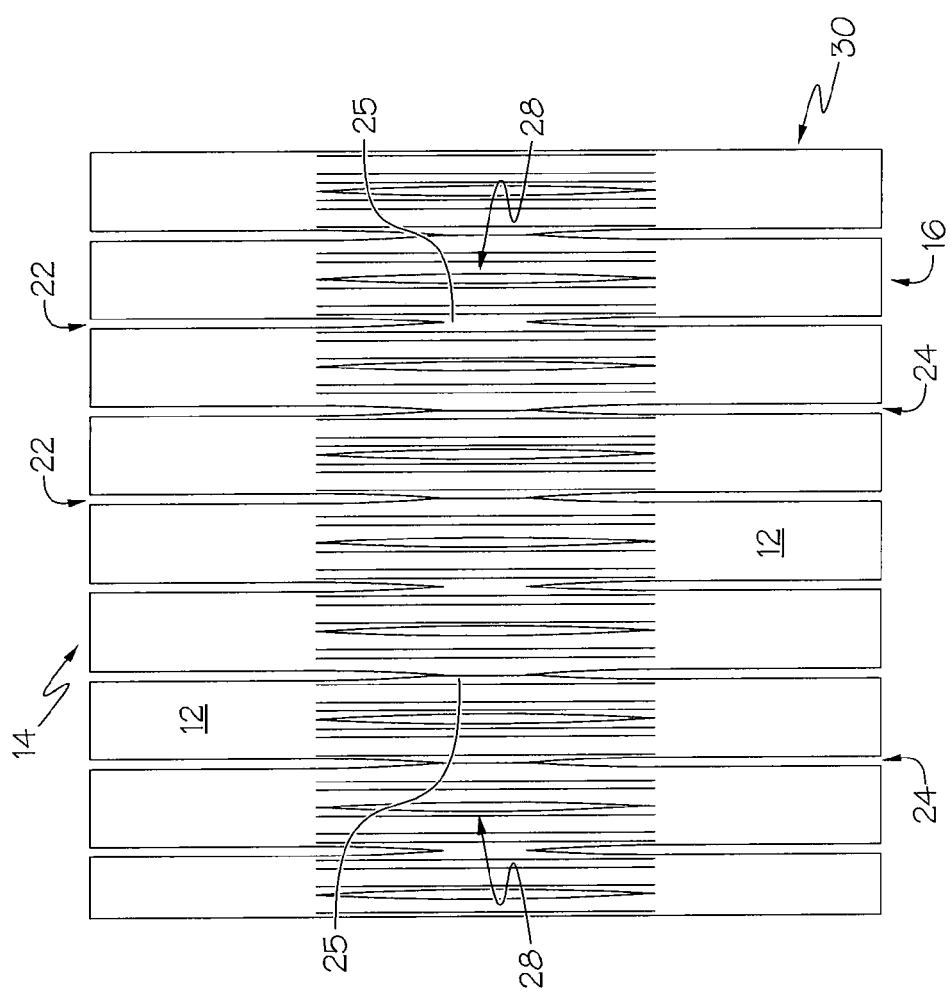

CORE METAL INSERT WITH MECHANICAL STRENGTHENING AND METHOD OF MAKING SAME

CROSS-REFERENCE TO RELATED APPLICATIONS

This application claims the benefit of U.S. Provisional Application No. 61/749,468, filed Jan. 7, 2013, the entire disclosure of which is hereby incorporated herein by reference.

FIELD OF THE INVENTION

The subject invention generally relates to a flexible weatherseal for a vehicle, and more specifically to an elongated carrier for the weatherseal that is mechanically strengthened.

BACKGROUND OF THE INVENTION

Core metal inserts for weatherseals generally are known. Various examples of core metal inserts are described in, e.g., U.S. Pat. Nos. 5,783,312, 5,871,682, 6,079,160, 6,889,985, and 7,604,766, the contents of each of which are incorporated herein by reference. The metal insert is typically coated or encapsulated by a suitable flexible material and bent to an appropriately shaped longitudinal contour to provide a particular weatherseal. The weatherseal has a longitudinally extending channel-shaped portion for gripping flange joints, such as those that extend around openings in motor vehicles. The metal insert is provided in the weatherseal so that when bent into a channel shaped cross-section (e.g., U-shaped), the embedded insert provides strength for gripping the flange joint to hold the weatherseal in place. The weatherseal can be fitted to an associated door or door frame, window or window frame, or other installation where it is desirable to provide a seal between an openable contrivance and its frame in the closed position.

To provide the above-mentioned flexible material over the metal insert, the insert is drawn through a coating extruder where a coating of such material is applied. Generally, the material is an elastomeric material, such as a natural or synthetic rubber or flexible foam, and is applied in an uncured or softened state over the metal insert. Following extrusion, the coating is caused or permitted to dry or cure, at which point the coating material becomes bound to the metal insert over their interfacial contact area.

During a conventional process for manufacturing a weatherseal, the metal insert is drawn through the coating extruder in tension. The coating material applied over the insert typically is cured or dried while the insert remains in tension. Conventionally, once the tension on the insert is released, the insert has a contractile tendency that causes it to contract from its lengthened state while embedded in the extrusion coating. This can result in at least two negative effects. First, contraction of the insert can cause the weatherseal to warp, meaning that it becomes curved undesirably, making it less able or unable to mate to the surface or flange to which it was designed to be fitted. Second, contraction of the insert can cause it to become detached from the flexible material coating over their interfacial contact area. Depending on the geometry of the insert, as well as other unpredictable factors, this insert-to-coating separation can occur at numerous unpredictable locations over the contact area. As a result, the insert can become freed to move independently of the coating at these locations, which can result in abrasion of the coating material by the metal insert over time (for example, resulting from repeated shutting of a door). As the coating material becomes increasingly degraded through abrasion, the seal provided by that coating can be compromised, contributing to premature failure of the weatherseal.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect of the present invention, an elongate core metal insert for reinforcing a resilient weatherseal comprises a main body portion extending along a longitudinal axis and opposed and longitudinally extending first and second edges, wherein the main body portion is located between the first and second edges. Opposed first and second face surfaces extend between the first and second edges and separated by an original thickness of the core metal insert. A plurality of longitudinally spaced apart first slots transversely extend from the first edge arranged in a first pattern that define a plurality of first fingers between adjacent pairs of first slots. A plurality of longitudinally spaced apart second slots transversely extend from the second edge arranged in a second pattern that define a plurality of second fingers between adjacent pairs of second slots. A plurality of flutes are formed into both of the first and second face surfaces of the core metal insert in an undulating pattern. The plurality of flutes extend between the first and second edges and being aligned in a common direction such the core metal insert is corrugated, wherein the corrugation of the core metal insert separates the first and second face surfaces by a distance greater than the original thickness of the core metal insert.

In accordance with another aspect of the present invention, one example method for making an elongate core metal insert for reinforcing a resilient weatherseal can comprise the step of providing a sheet metal blank that comprises a main body portion extending along a longitudinal axis with opposed and longitudinally extending first and second edges and opposed first and second face surfaces extending between the first and second edges and separated by an original thickness of the core metal insert. The method can further include the step of providing a first pattern of longitudinally spaced apart first slots transversely extending from the first edge. The method can further include the step of providing a second pattern of longitudinally spaced apart second slots transversely extending from the second edge. The method can further include the step of lengthening said sheet metal blank to expand said first and second slots to define a plurality of first fingers between adjacent pairs of first slots and to define a plurality of second fingers between adjacent pairs of second slots. The method can further include the step of corrugating both of the first and second face surfaces of the core metal insert in an undulating pattern to form a plurality of flutes extending between the first and second edges. The method can further include the step of extrusion-coating the core metal insert with a flexible material to provide a weatherseal.

It is to be understood that both the foregoing general description and the following detailed description present example and explanatory embodiments of the invention, and are intended to provide an overview or framework for understanding the nature and character of the invention as it is claimed. The accompanying drawings are included to provide a further understanding of the invention and are incorporated into and constitute a part of this specification. The drawings illustrate various example embodiments of the invention, and together with the description, serve to explain the principles and operations of the invention.

BRIEF DESCRIPTION OF THE DRAWINGS

The foregoing and other aspects of the present invention will become apparent to those skilled in the art to which the present invention relates upon reading the following description with reference to the accompanying drawings, in which:

FIG. 1 shows an example sheet metal blank for a core metal insert that has been lanced to provide a pattern of through-slits;

FIG. 2 shows an example core metal insert prepared by stretching the blank of FIG. 1;

FIG. 2a is a cross-section of the core metal insert taken along line 2a-2a in FIG. 2;

FIG. 4 is a top view of the core metal insert of FIG. 3;

FIG. 5 is a front side view of the core metal insert of FIG. 3;

FIG. 6 is a side view of the core metal insert of FIG. 3;

FIG. 7 is similar to FIG. 5, but shows one example finish size;

FIG. 8 is similar to FIG. 5, but shows another example finish size;

FIGS. 9A-9B are similar to FIG. 4, but show different corrugation configurations;

DESCRIPTION OF EXAMPLE EMBODIMENTS

Figure 3:
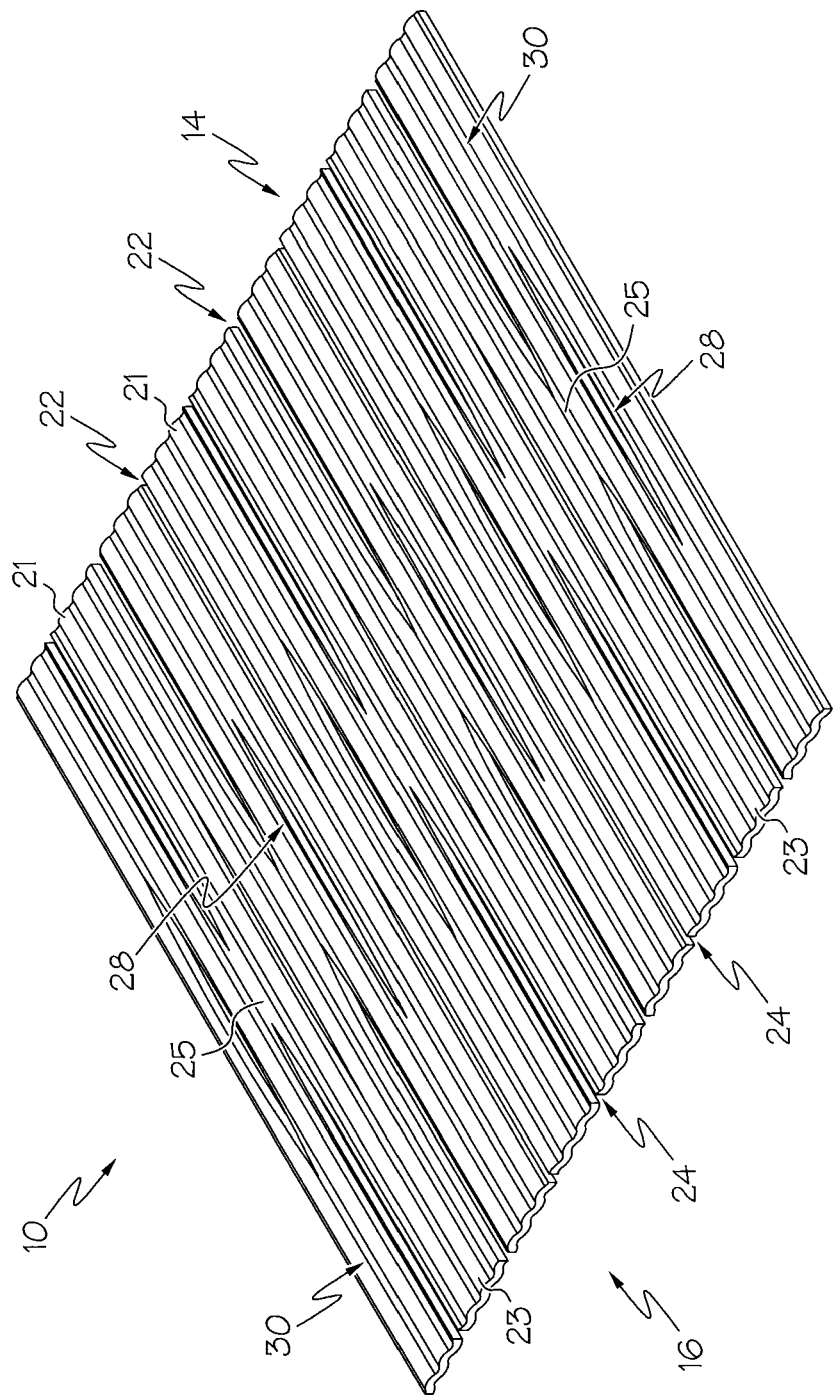
FIG. 3 illustrates a perspective view of an example core metal insert with one example of mechanical strengthening.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

Various features will now be further described and understood in the context of certain embodiments described below. It is to be understood, however, that the invention is not to be limited to the specific core metal insert structures and geometries that follow. Additionally, the use of through-slits and/or optional score marks to produce stress-relief as described herein can be practiced for a wide variety of other core metal insert designs and geometries beyond those described herein, as will be understood by a person having ordinary skill in the art.

An example core metal insert as disclosed herein is illustrated and will be initially understood with reference to FIGS. 1 and 2. FIG. 1 shows an elongate core metal insert for reinforcing a resilient weatherseal that comprises a sheet metal blank 5 that has been lanced to produce through-slits 122, 124, 128, and optional score marks 32, 34, 36, prior to being lengthened. In FIG. 1, the through-slits extend at an approximately 90 angle relative to the longitudinal extent or axis of the insert 10 as represented by arrow "a," though this is not required. FIG. 2 shows the core metal insert 10 made by lengthening the sheet metal blank 5 in FIG. 1 to produce open slots 22 and 24 and openings 28 from the corresponding through-slits, as more fully described below. Lengthening the blank 5 also results in widening any optional score marks in the resulting insert 10 (widening not illustrated). It will be appreciated that the insert 10 in FIG. 2 is shown prior to being bent to a U- or channel-shape cross-section, and prior to being coated with flexible material. The core metal insert 10 preferably is manufactured from a flat strip or length of material having substantially uniform thickness. That is, in the illustrated embodiment the insert 10 does not have any reduced-thickness portions, such as longitudinally extending grooves produced through coining as is known in the art. Of course, such uniform thickness (absence of coining) is not required, and various reduced-thickness portions can be utilized as desired. For example, coining could be used in an alternate variation of the core metal insert 10.

Conventionally, the rigidity of the carrier, and thereby the weatherseal, has been dependent upon the actual thickness of the metal utilized for the carrier, and conventionally an increased rigidity was provided by an increased metal thickness. However, increasing the actual thickness of the metal utilized is generally undesirable because it increases the cost of the carrier and resulting weatherseal, as well as also increasing the weight of the weatherseal. Thus, one solution to this problem is described herein. The core metal insert 10 can be mechanically strengthened without increasing the thickness of the stock metal blank material and, instead, can permit the use of a metal blank that utilizes less material while mechanically strengthening the insert 10, such as by increasing the strength, stiffness, and/or rigidity of the insert 10, to thereby reduce the weight and ultimate cost of carrier. Conventionally, the material thickness of the original blank 5 used to make the described insert 10 can be approximately 0.020". In comparison, the mechanical strengthening described herein can provide an insert 10 of similar or greater structural strength using an original blank 5 with reduced material thickness, for example of approximately 0.012"-0.016" (e.g., see FIG. 7 original thickness $T_1$). Therefore, the mechanical strengthening described herein can make the insert 10 significantly lighter per unit length.

Turning now to the attached FIGS. 3-6 of the present application, the example core metal insert 10 of FIGS. 1-2 is illustrated with one example of mechanical strengthening. The insert 10 has a main body portion extending along a longitudinal axis that comprises a generally solid central region 25. The insert 10 further has opposed and longitudinally extending first and second edges 14 and 16, with the main body portion being located between the first and second edges 14, 16. Opposed first and second face surfaces 12, 13 are substantially parallel and opposite from one another, and extending between the first and second edges 14 and 16. The face surfaces 12 and 13 are spaced apart by original thickness $T_1$ of the core metal insert 10.

The edges 14 and 16 are made discontinuous by respective series of first and second plurality of longitudinally spaced-apart slots 22 and 24 that extend laterally of the length of the insert 10. The plurality of longitudinally spaced apart first slots 22 extend transversely from the first edge 14 and are arranged in a first pattern that define a plurality of first fingers 21 between adjacent pairs of first slots 22. Similarly, the plurality of longitudinally spaced apart second slots 24 extend transversely from the second edge 16 and are arranged in a second pattern that define a plurality of second fingers 23 between adjacent pairs of second slots 24.

These slots 22 and 24 are formed when the original blank 5 is stretched to produce the insert 10, by opening up the respective series of through-slits provided in the blank 5. In the illustrated embodiment, the first and second patterns can be similar such that the first series of slots 22 is longitudinally aligned with the second series of slots 24. However, it is also contemplated that the first series of slots 22 can be longitudinally offset from the second series of slots 24. Each aligned pair of slots 22 and 24 can be separated from one another by the associated solid central region 25 that has not been slotted. The central region(s) 25 may be provided with optional score mark(s).

A plurality of longitudinally spaced-apart openings 28 also are provided in the insert 10. The openings 28 are located in the insert 10 substantially centrally between the opposed edges 14 and 16, in alternating sequence with the periodic and longitudinally spaced solid central regions 25 that separate aligned pairs of the slots 22 and 24. Each opening 28 extends from a first vertex 27 that defines the extent of the associated opening 28 toward the first edge 14, to a second vertex 29 that defines the extent of that opening 28 toward the second edge 16.

The insert 10 described above is made by stretching or lengthening the original sheet metal blank. Lengthening can be achieved via application of a tensile force as known in the art. In an alternative embodiment, if a reduced-thickness portion or groove is desired, then lengthening also can be achieved through coining to provide the groove as known in the art. Both pinch-roll compression and coining are effective to reduce the prevailing thickness of the blank, and to lengthen the blank longitudinally to produce the resulting core metal insert 10. Lengthening the blank also expands (opens up) the through-slits 122, 124, 128 therein to provide the associated slots 22, 24 and the openings 28 discussed above. The through-slits and optional score marks can be provided via any conventional or suitable method or technique. For example, they can be provided via rotary lancing. Briefly, in rotary lancing a cutting die in the form of a wheel having a sharpened circumferential cutting edge is rotated about its axis, and the rotating cutting edge is brought into contact with the surface or substrate (sheet metal blank) to be incised or "lanced." The depth of the resulting incision can be controlled by translating the cutting die, as it is cutting, toward the substrate to a degree corresponding to the desired lance depth.

For example, after the desired pattern of through-slits and optional score marks have been provided in the metal blank, the blank is lengthened to longitudinally expand the blank to produce the core metal insert 10. This opens up the through-slits to produce the corresponding slots and openings as mentioned above. The metal blank can be stretched to produce at least a 5%, 10%, or 15% length increase for the resulting core metal insert 10 compared to the metal blank. As a result, the lengthened core metal insert provides a relatively longer structure with more saleable material length as compared to a non-lengthened product. It is understood that the metal blank can be lengthened to a greater or lesser extent, for example up to 100% length increase or greater, depending on the pattern of through-slits, the corresponding capacity of the blank to be stretched, the ductility of the metal blank material, etc. While the figures of the present application illustrate one example geometry of the insert 10 and one example method of lengthening, it is understood that the structure and/or methodology of the present application can similarly be applied to inserts 10 having various other geometries or lengthening methods,
such as any or all of those described in any of U.S. Pat. Nos. 6,079,160, 6,889,985, and 7,604,766, the contents of each of which are incorporated herein by reference.

Figures 13A, 13B:
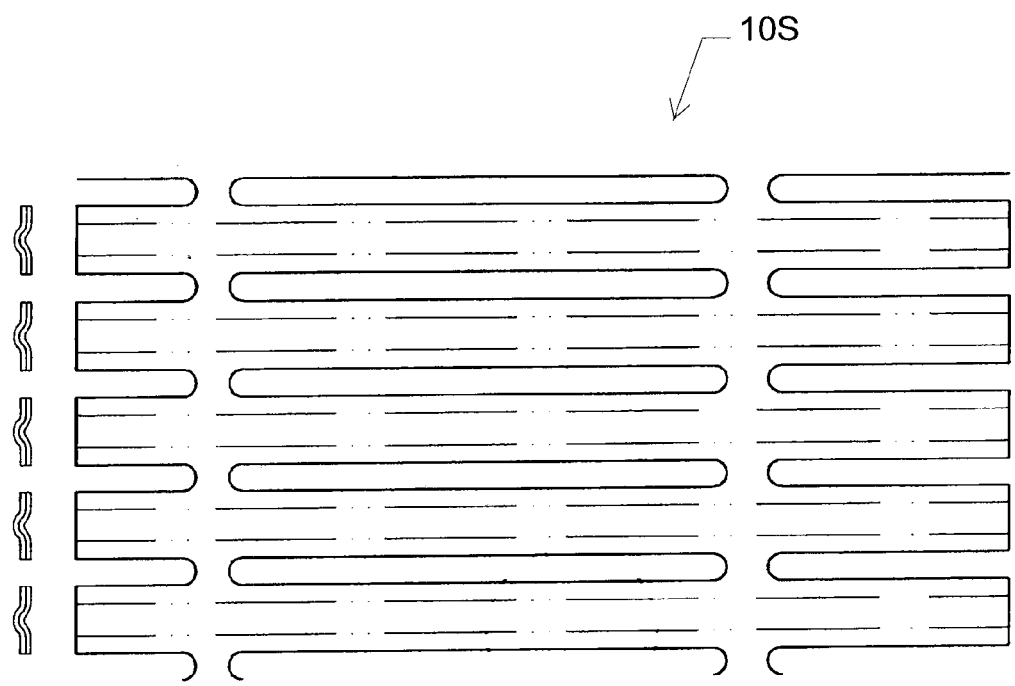
FIGS. 13A-13B illustrate a known core metal insert.

By contrast, it is known to provide a core metal insert where the open slots are formed by a stamping operation, as is known in the art, instead of the above-described longitudinal lengthening that uses the through-slits. However, the use of a stamping operation is very expensive and wasteful, because all of the material removed by the stamping operation to make the slots results in a large amount of wasted material and extra material cost. It also produces much less saleable material length as compared to the longitudinally lengthened product. One known example insert 10S is shown in the top view of FIG. 13A as a dual-track variation. As shown in the side view of FIG. 13B, it is also known to include ribs along one face of the stamped core metal insert. However, this procedure is difficult and expensive to manufacture, because the ribs must be precisely aligned and registered along the non-stamped portions, which is labor intensive, time consuming, and results in a large amount of waste product.

In order to advance the art, different methods can be used to strengthen the core metal insert 10. In one example, as shown in FIGS. 3-6, both of the face surfaces 12, 13 of the insert 10 can be deformed to mechanically strengthen the metal material. The strip of metal material can be deformed into an undulating shape that increases the structural stability of the elongate strip of material to improve its ability to withstand compressive and torsional loads. For example, a plurality of discrete longitudinal corrugations 30 can be formed into the face surfaces 12, 13 such that different alternating portions of each face surface 12, 13 are either raised or recessed. In one example, as shown in FIGS. 7-8, a plurality of flutes (when viewed from the edge) can be formed into the first and second face surfaces 12, 13 of the core metal insert 10 in an undulating pattern. The longitudinal corrugations 30 can be formed in a pattern, such as a regular periodic pattern, although various other patterns, arrays, or even random corrugations could be used. In the illustrated example of FIGS. 7-8, the flutes can be formed into a sine wave or sinusoid geometry that describes a relatively smooth, repetitive oscillation. In other embodiments, the undulating shape of the flutes can have another shape, such as squared, triangular, angled, or other regular or irregular shape.

The longitudinal corrugations 30 (i.e., flutes) can extend between the first and second edges 14, 16 and can be formed at least partially across the width of the metal insert 10 extending in a direction between edges 14 and 16. In the illustrated examples of FIG. 4, each discrete longitudinal corrugation 30 extends substantially completely across the width of the metal insert 10 extending between edges 14 and 16. Thus, each discrete longitudinal corrugation 30 is substantially continuous between the edges 14 and 16 (regardless of the slots 22, 24 and openings 28). Still, it is contemplated that the longitudinal corrugations 30 could only extend partially across the face surfaces 12, 13. In one example, the longitudinal corrugations 20 can extend from either or both of the edges 14, 16 towards the solid central regions 25. For example, as shown in FIG. 9A, the solid central regions 25 could remain uncorrugated, while portions of the face surfaces 12, 13 near either or both of the edges 14, 16 are corrugated. This configuration can be useful to strengthen the edges, which can be more vulnerable than the solid central region (especially if the insert is ultimately formed into a U-shape). The corrugation near either or both of the edges 14, 16 could be the same, or even different patterns, periods, amplitudes, shapes, etc. Alternatively, as shown in FIG. 9B, the solid central regions 25 could be corrugated while portions of the face surfaces 12, 13 near either or both of the edges 14, 16 remain uncorrugated. This configuration could be beneficial to provide an increased mechanical strength, stiffness, and/or rigidity to the insert 10 (e.g., about the solid central regions 25), while also maintaining relatively smooth and undeformed edges 14, 16 so that when the outer weatherseal material is extruded over the insert the resulting weatherseal material is similarly smooth and undeformed about the edge regions. For example, after the weatherseal material has cooled and shrunk to its final size about the relatively smooth and undeformed edges 14, 16, the resulting product can provide a mechanically sound and/or aesthetically pleasing end product. Otherwise, corrugations near either or both of the edges 14, 16 could cause the cooled weatherseal material to impart an uneven or wavy appearance to the finished weatherseal. In still yet another variation, although not shown, the solid central regions 25 could be corrugated as well as a portion near a selected one of the edges 14, 16, while the other edge 14, 16 remains uncorrugated. Still, various amounts, types, patterns, and positions of corrugations are contemplated.

Moreover, the longitudinal corrugations 30 can extend across the face surfaces 12, 13 in a direction along various angles. The plurality of flutes can extend between the first and second edges 14, 16 aligned in a common direction. In one example, all of the flutes can be aligned in a common direction. Alternatively, some of the flutes can be aligned in a common direction, while other flutes are aligned in a separate direction (such as separate groups of flutes being aligned in different directions). As illustrated, the longitudinal corrugations 30 extend substantially transverse to a longitudinal extent of the insert 10. For example, some or even all of all of the plurality of flutes can be substantially perpendicular to the first edge (and/or the second edge). By "substantially perpendicular," is understood that the flutes are nominally oriented 90 degrees relative to the first or second edge within 5 degrees (i.e., 85 to 95 degrees) to accommodate manufacturing tolerances. Still, the longitudinal corrugations 30 could extend across the face surfaces 12, 13 at various other angles. Where multiple patterns of longitudinal corrugations 30 are used, each pattern could be arranged at the same or even different angles. For example, different patterns of longitudinal corrugations 30 about each of the edges 14, 16 could be oriented at different angles.

Additionally, it is contemplated that the longitudinal corrugations 30 are not registered or aligned with any of the slots 22, 24, central regions 25, and openings 28 of the insert 10 such that the longitudinal corrugations 30 can occur randomly with respect to the slots 22, 24, central regions 25, and openings 28. That is, the longitudinal corrugations can be arranged in a pattern that is independent and misaligned with the first pattern of the first slots 22 and/or the second pattern of the second slots 24. Application of the discrete corrugations can be applied independently of the slots 22, 24, central regions 25, and openings 28 of the insert 10. For example, the discrete corrugations could be applied in a particular pattern that has no relation or registration to the slots 22, 24, central regions 25, and openings 28. As one example, the discrete corrugations could be applied periodically in a pattern that has a frequency with a first peak-to-peak period (i.e., see FIG. 7 period P1), while any or all of the slots 22, 24, central regions 25, and openings 28 could be applied periodically in another pattern that has a frequency with a second period. The first and second periods can be completely independent and have no relation or registration to each other. Thus, as shown in FIG. 4, each discrete longitudinal corrugation 30 may or may not occur across the various slots 22, 24, central regions 25, and openings 28. This design can make manufacturing easier, because the discrete corrugations can be formed using a manufacturing operation that is separate from that of the various the slots 22, 24, central regions 25, and openings 28, and the different manufacturing operations do not have to be made to coincide, which can be difficult. Still, the longitudinal corrugations 30 could also be registered or aligned so as to occur periodically and consistently in a desired pattern.

When the metal of the insert 10 is corrugated via cold roll-forming (or other cold working technique), there may also be a change in the mechanical properties of the material by virtue of the cold working of the metal. For example, the yield strength, ultimate strength, ductility, stiffness, and/or rigidity of the metal can be increased as a result of this cold working, particularly in the bends of the corrugations. Other factors that can affect cold working include roll pressure, corner radius and the properties of the steel. For example, the ductility of the steel can be reduced as result of cold-forming process. Turning now to FIGS. 7-8, two different example corrugated insert 10 configurations are shown. It is noted that the original thickness $T_1$, $T_2$ of the nominal metal blank for each insert 10 is the approximately the same (i.e., 0.016"), and that the period $P_1$, $P_2$ of the corrugations 30 is also the same (i.e., 0.054"). This can permit the use of the same base metal stock for different product lines, together with the same corrugation production machine (e.g., with the same corrugation rollers).

The corrugation of the core metal insert 10 separates the first and second face surfaces 12, 13 by a distance greater than the original thickness of the core metal insert 10. However, it is also noted that the amplitude of the corrugation is different between FIGS. 7-8, resulting in a different finished thickness for each product. As shown in FIG. 7, an original material thickness $MT_1$ of 0.016" yields a finished thickness $H_1$ of 0.025" for the resulting insert 10 by using a bend radius $R_1$ of 0.015" for the corrugation flutes. Alternatively, as shown in FIG. 8, a similar original material thickness $MT_2$ of 0.016" yields a finished thickness $H_2$ of 0.030" for the resulting insert 10B by using a different bend radius $R_2$ of 0.009" for the corrugation flutes. The finished thickness $H_1$, $H_2$ represents the distance between the first and second face surfaces 12, 13 after corrugation as defined by peak-to-peak crests of the flutes. The different finished thicknesses, achieved via the different amplitudes of the corrugation wave crest, can be done to provide different inserts 10 having different sizes as desired by the intended weatherseal. In addition or alternatively, the different finished thicknesses achieved via the different corrugation bend radiuses can be used to adjust the insert 10 to balance the resulting yield strength, ultimate strength, and/or ductility with stiffness and/or rigidity to manufacture a weatherseal having the desired mechanical properties using a reduced thickness base metal blank.

Additionally, the corrugations 30 will also reduce the linear length of the insert 10 (e.g., along the longitudinal axis). It is contemplated that a unit length of the core metal insert will be reduced in length by at least 5% after corrugation. For example, in the examples shown in FIGS. 7-8, the corrugations 30 will reduce the linear length $L_1$, $L_2$ of the insert 10 of FIG. 7 to about 92% of the non-corrugated length (i.e., an 8% length reduction), while the insert 10 of FIG. 8 that has a relatively larger corrugation amplitude will have a length L reduced to about 85% of the non-corrugated length (i.e., a 15% length reduction). It is contemplated that the length reduction is generally uniform along the elongate length of the insert 10, although it is also contemplated that the length reduction could be non-uniform along portions. Even so, it is further noted that the core metal insert is formed of a web of material that has an original thickness that is substantially the same as a final thickness of the web of material after corrugation. For example, due to the reduction in length for the insert 10, the nominal material thickness $MT_1$, $MT_2$ of the metal blank that has been corrugated remains approximately the same as the original thickness $T_1$, $T_2$ of the metal blank for each insert 10. Thus, despite lengthening the core metal insert to expand the slots, and also reducing the length of the core metal insert by corrugation, the material thickness MT1, MT2 remains approximately the same such that the material can retain some of its nominal mechanical properties.

Figure 12:
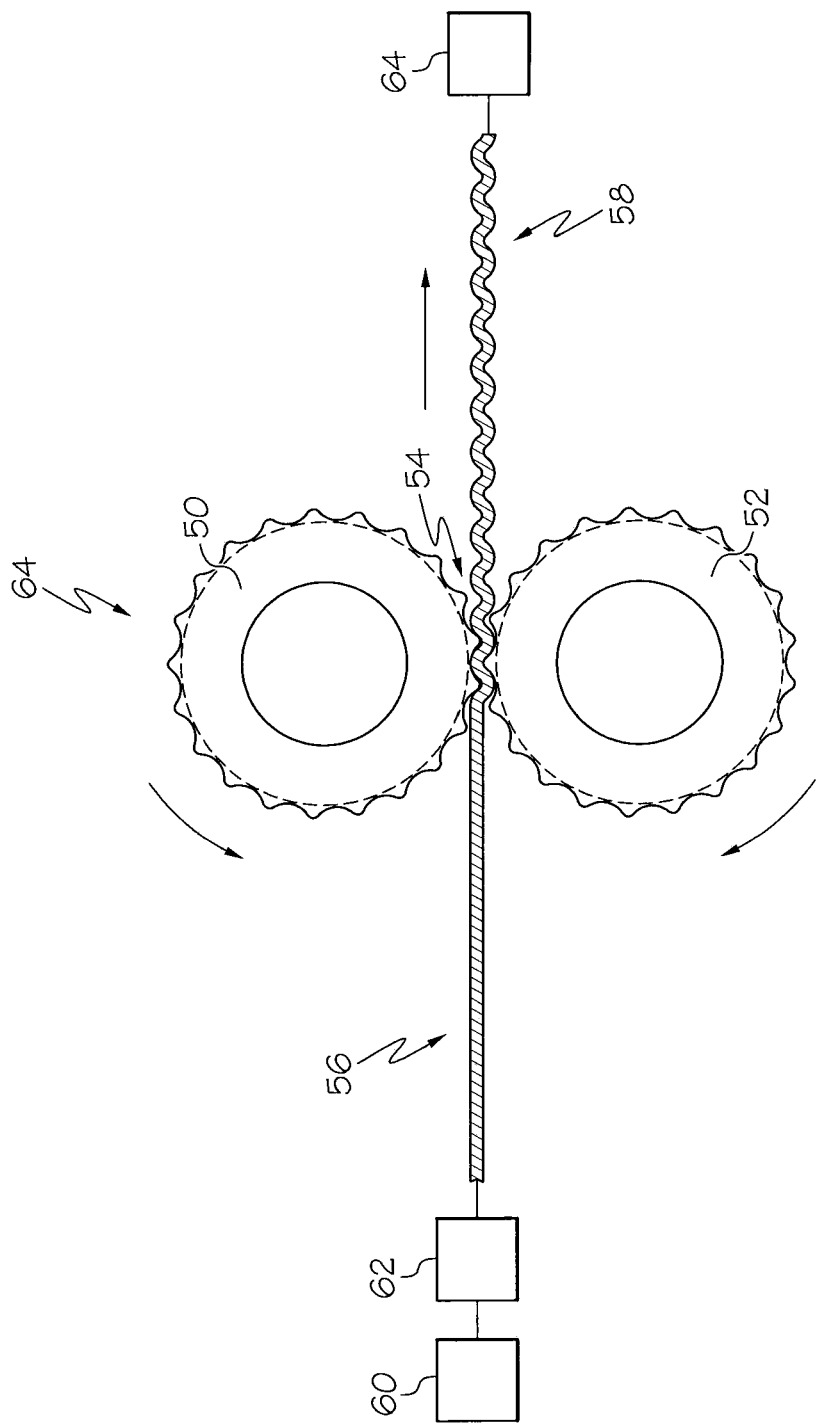
FIG. 12 illustrates one example manufacturing operation.

Various structures and/or methodologies can be used to produce the corrugations 30. In one non-limiting example, as shown in FIG. 12, the strip of metal can be passed through a roll-former, such as a set of corrugated rollers. For example, a pair of corrugating rollers 50, 52 cooperate to define, at a nip 54 therebetween, a corrugating labyrinth between respective and interlocking pluralities of corrugating teeth provided on the corrugating rollers. In some embodiments, one or more of rollers can have a generally smooth outer surface. In other embodiments, one or more of rollers 50, 52 include a corrugated surface including a plurality of teeth that extend from the outer surfaces of rollers 50, 52 and along the length of the rollers 50, 52. (The dashed line extending around rollers 50, 52 schematically represent the plurality of teeth that can extend entirely around rollers in some embodiments). In some embodiments, rollers 50, 52 are configured to mesh with each other to cooperatively engage with the metal strip of material for the insert 10. For example, in some example embodiments where rollers 50, 52 include teeth, the teeth are configured to have a period and amplitude corresponding to that desired to be formed into the corrugated insert 10. The rollers 50, 52 are arranged to have at least a distance between them where the strip of material can pass through.

As the elongate metal strip of material for the insert 10 is drawn through the nip on rotation of the corrugating rollers, the interlocking pluralities of corrugating teeth are effective to deform the metal strip to form undulations and thereby corrugate the metal strip. The strip of elongate metal prior to corrugation (which may or may not have slots and/or be elongated) is shown by reference number 56, while the corrugated metal strip is shown by reference number 58. The teeth can have a variety of different shapes, such as sinusoidal, arcuate, square, rectangular, triangular, and other desired shapes. Depending on the shape of the teeth, different undulating shapes can be formed. In some embodiments, the undulating shape is sinusoidal. In other embodiments, the undulating shape has another shape, such as squared, triangular, angled, or other regular or irregular shape, based upon the shape and interaction of the teeth forming the corrugating labyrinth. Note that the speed of the web through the corrugating apparatus can be controlled primarily by the demand for medium material through the corrugating labyrinth based on the speed of the corrugating rollers. Some finite, non-zero tension typically is desirable in the web on entrance into the corrugating labyrinth. Further, the mean tension in the web is compounded significantly as a result of traversing the labyrinth. Adjusting the tension in the metal strip of material aids in minimizing or preventing fracturing due to tensile overstressing of the medium as it is drawn through the corrugating labyrinth where the corrugations 30 are formed into the insert 10.

It is understood that the corrugations 30 can be formed into the insert 10 either before or after the original metal blank is lanced, and/or is later stretched and lengthened to produce open slots 22 and 24 and openings 28. Generally, it can be preferable to form the corrugations 30 into the insert 10 after the metal blank is lanced and then stretched and lengthened to produce open slots 22 and 24 and openings 28, because the corrugations 30 can cause difficulty with creation of the through-slits and optional score marks prior to the lengthening process, as well as possibly inducing undesired bends or warping in the insert 10. Thus, the corrugating rollers and labyrinth can be provided towards the end of the manufacturing line such that the corrugations 30 are formed into the insert 10 as a near-final or final manufacturing step prior to the finished insert 10 being wound onto a storage roll. It is further contemplated that multiple sets of corrugation rollers can be utilized to achieve the desired corrugations 30.

Thus, in one example manufacturing operation shown in FIG. 12, through-slits and/or optional score marks can be created on the original metal blank at stage 60. Additionally, any optional coining or other processes can be performed. Next, at stage 62, the metal blank can be stretched and lengthened via one or more sets of rollers to produce open slots 22 and 24 and openings 28. Next, at stage 64, the corrugations 30 can be formed into the insert 10. Finally, at stage 66, the finished insert 10 can be wound onto a storage roll. Of course, various other intermediate operations can be performed. However, it is contemplated that the corrugations 30 can be formed into the insert 10 either before the original metal blank is lanced, and even before it is stretched and lengthened to produce open slots 22 and 24 and openings 28. In one example, the original metal blank 5 could be corrugated, and then lanced, and then stretched and lengthened to produce open slots 22 and 24 and openings 28. If manufactured using a roll-to-roll style operation, the metal blank 5 could be corrugated and then wound up on a roll, which is then moved to another manufacturing stage where the pre-corrugated roll is then unwound, lanced, and then stretched and lengthened. In yet another example, the original metal blank 5 could be lanced, and then corrugated, and then stretched and lengthened to produce open slots 22 and 24 and openings 28. Again, if manufactured using a roll-to-roll style operation, the metal blank 5 could be lanced and then wound up on a roll, which is then moved to another manufacturing stage where the pre-lanced roll is then unwound, corrugated, and then stretched and lengthened.

Figure 10:
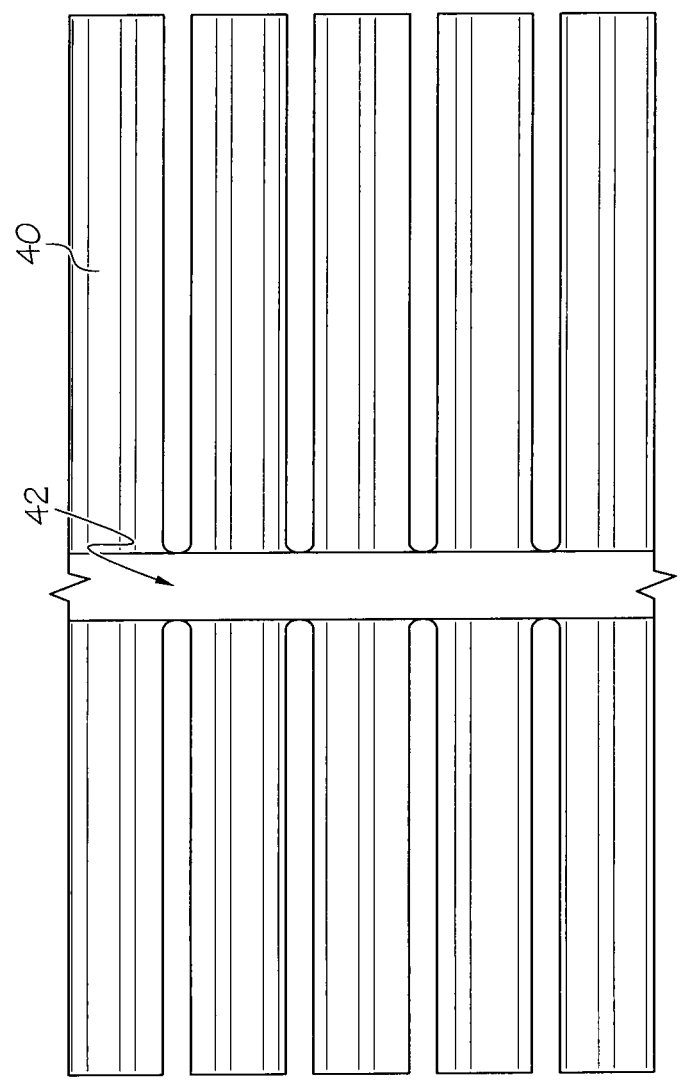
FIGS. 10-11 illustrate several more example core metal insert geometries.
Figure 11:
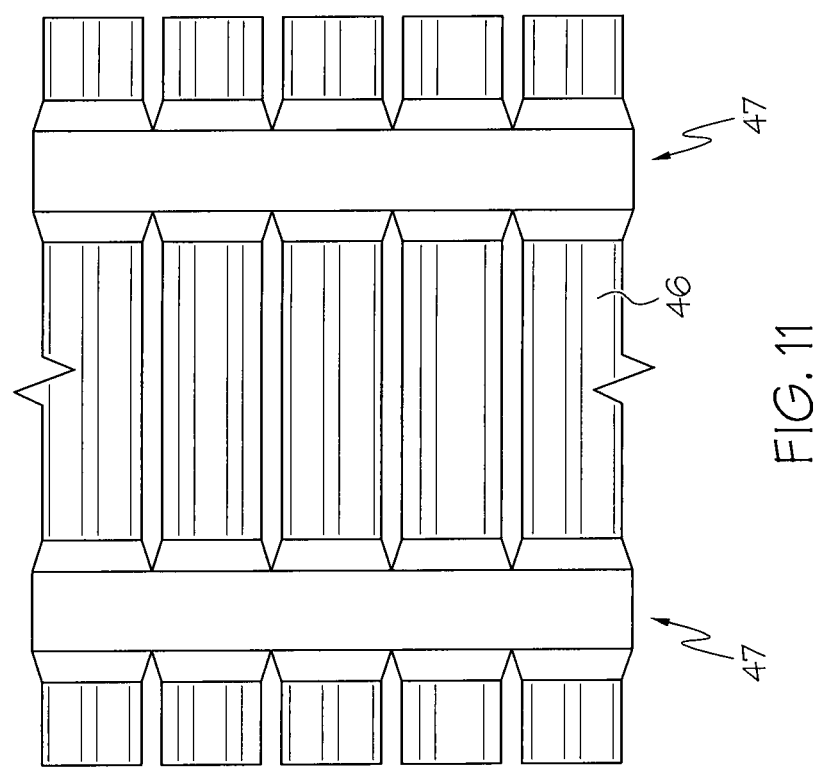

Additionally, it is contemplated that the mechanical strengthening described herein can be applied to core metal inserts having various geometries. FIGS. 10-11 illustrate several more example core metal insert geometries, including an example single-track variation 40 of FIG. 10 having a single connecting track 42, and an example double-track variation 46 of FIG. 11 having two connecting tracks 47. The longitudinal corrugations as described herein can similarly be applied to any or all of these geometries, or even other core metal insert geometries. In a further example, the single-track variation 40 of FIG. 10 can include one or more longitudinally extending groove(s) along the single connecting track 42 produced through coining as is known in the art.

To make a weatherseal reinforced by the core metal insert 10, the insert 10 (before or after bending to channel-shape cross-section) can be fed through an extrusion torpedo or coating extruder where the flexible or elastomeric material is extruded over, thereby encapsulating, the insert 10. During and as a consequence of the extrusion procedure, a longitudinally acting tensile force is applied to the insert 10 as it is drawn through the extruder, which may further lengthen the insert and which holds it in tension. If no optional coining is used, then lengthening can be entirely provided through tensioning the blank/insert while it is drawn through the extruder, such that lengthening and extrusion-coating are carried out in a single operation. Otherwise, lengthening can be conducted entirely prior to extrusion-coating or partly before and partly during extrusion-coating. Following extrusion-coating, the tension in the insert 10 (now coated with the flexible coating to provide the resulting weatherseal) is released.

Thus, taking the above description into consideration, one example method for making an elongate core metal insert for reinforcing a resilient weatherseal can comprise the step of providing a sheet metal blank that comprises a main body portion extending along a longitudinal axis with opposed and longitudinally extending first and second edges and opposed first and second face surfaces extending between the first and second edges and separated by an original thickness of the core metal insert. The method can further include the step of providing a first pattern of longitudinally spaced apart first slots transversely extending from the first edge. The method can further include the step of providing a second pattern of longitudinally spaced apart second slots transversely extending from the second edge. The method can further include the step of lengthening said sheet metal blank to expand said first and second slots to define a plurality of first fingers between adjacent pairs of first slots and to define a plurality of second fingers between adjacent pairs of second slots. The method can further include the step of corrugating the first and second face surfaces of the core metal insert in an undulating pattern to form a plurality of flutes extending between the first and second edges. The method can further include the step of extrusion-coating the core metal insert with a flexible material to provide a weatherseal.

Various other steps can also be performed, in various orders, and some or all of which may be optional. In one example, the step of corrugating the first and second face surfaces is performed after the step of lengthening said sheet metal blank. In another example, the step of corrugating reduces a unit length of the core metal insert by at least 5% relative to an original unit length of the core metal insert. In another example, the step of corrugation provides all of the plurality of flutes as being aligned in a common direction. In another example, the step of corrugation separates the first and second face surfaces by a distance greater than the original thickness of the core metal insert. In another example, the step of corrugation forms the plurality of flutes arranged in a third pattern that is independent and misaligned with the first pattern of the first slots. In another example, the step of corrugation forms the plurality of flutes about the main body portion, and are not about the first and second edges. In another example, the step of corrugation forms the plurality of flutes about at least one of the first and second edges, and not about the main body portion. In another example, the step of corrugation forms the plurality of flutes with a sine-wave geometry.

A core metal insert 10 as described herein can be made from any suitable or desirable or conventional material, including but not limited to cold rolled steel, stainless steel or aluminum. The dimensions of a particular insert will depend on the application, including the dimensions and required tensile strength for the required weatherseal. The following dimensions are examples of a typical embodiment of an insert 10 before the weatherseal material is applied, and are in no way limiting of the potential dimensions in which an insert 10 or a weatherseal incorporating the insert 10 can be provided. Width between edges 14 and 16: 0.5-3.5 inches. Thickness of the material (prevailing) between face surfaces 12 and 13 (prior to corrugation): 0.010-0.036 inch. Width of slots 22, 24: 0.001-0.1 inch, or more (relative to longitudinal extent of insert 10). Width of openings 28: 0.001-0.1 inch, or more (relative to longitudinal extent of insert 10).

The core metal insert may also include additional features as described in any of U.S. Pat. Nos. 6,079,160, 6,889,985, and 7,604,766, and the contents of each of which are incorporated herein by reference.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. An elongate core metal insert for reinforcing a resilient weatherseal, comprising:
   a main body portion extending along a longitudinal axis;
   opposed and longitudinally extending first and second edges, wherein the main body portion is located between the first and second edges;
   opposed first and second face surfaces extending between the first and second edges and separated by an original thickness of the core metal insert;
   a plurality of longitudinally spaced apart first slots transversely extending from the first edge arranged in a first pattern that define a plurality of first fingers between adjacent pairs of first slots;
   a plurality of longitudinally spaced apart second slots transversely extending from the second edge arranged in a second pattern that define a plurality of second fingers between adjacent pairs of second slots; and
   a plurality of flutes formed into both of the first and second face surfaces of the core metal insert in an undulating pattern, the plurality of flutes extending between the first and second edges and being aligned in a common direction such the core metal insert is corrugated,
   wherein the corrugation of the core metal insert separates the first and second face surfaces by a distance greater than the original thickness of the core metal insert,
   wherein the plurality of flutes are arranged in a third pattern that is independent and misaligned with the first pattern of the first slots,
   wherein the plurality of flutes are formed about the main body portion and are not formed about the first and second edges, or are formed about at least one of the first and second edges and are not formed about the main body portion.

2. The core metal insert of claim 1, wherein the distance between the first and second face surfaces after corrugation is defined by peak-to-peak crests of the flutes.

3. The core metal insert of claim 1, wherein all of the plurality of flutes are aligned in a common direction.

4. The core metal insert of claim 3, wherein all of the plurality of flutes are substantially perpendicular to the first edge.

5. The core metal insert of claim 1, wherein the first and second patterns are similar such that the first set of slots are longitudinally aligned with the second set of slots.

6. The core metal insert of claim 1, wherein a unit length of the core metal insert is reduced in length by at least 5% after corrugation.

7. The core metal insert of claim 1, wherein the core metal insert is formed of a web of material that has an original thickness that is substantially the same as a final thickness of the web of material after corrugation.

8. The core metal insert of claim 1, wherein the plurality of flutes comprise a sine-wave geometry.

9. A method for making an elongate core metal insert for reinforcing a resilient weatherseal, comprising the steps of:

providing a sheet metal blank that comprises a main body portion extending along a longitudinal axis with opposed and longitudinally extending first and second edges and opposed first and second face surfaces extending between the first and second edges and separated by an original thickness of the core metal insert;

providing a first pattern of longitudinally spaced apart first slots transversely extending from the first edge;

providing a second pattern of longitudinally spaced apart second slots transversely extending from the second edge;

lengthening said sheet metal blank to expand said first and second slots to define a plurality of first fingers between adjacent pairs of first slots and to define a plurality of second fingers between adjacent pairs of second slots;

corrugating both of the first and second face surfaces of the core metal insert in an undulating pattern to form a plurality of flutes extending between the first and second edges, wherein the step of corrugation forms the plurality of flutes in a third pattern that is independent and misaligned with the first pattern of the first slots, wherein the step of corrugation forms the plurality of flutes about the main body portion and not about the first and second edges, or about at least one of the first and second edges and not about the main body portion, and extrusion-coating the core metal insert with a flexible material to provide a weatherseal.

10. The method of claim 9, wherein the step of corrugating the first and second face surfaces is performed after the step of lengthening said sheet metal blank.

11. The method of claim 10, wherein the step of corrugating reduces a unit length of the core metal insert by at least 5% relative to an original unit length of the core metal insert.

12. The method of claim 9, wherein the step of corrugation provides all of the plurality of flutes as being aligned in a common direction.

13. The method of claim 9, wherein the step of corrugation separates the first and second face surfaces by a distance greater than the original thickness of the core metal insert.

14. The method of claim 9, wherein the step of corrugation forms the plurality of flutes with a sine-wave geometry.

* * * * *